(12) United States Patent
Lin

(10) Patent No.: US 9,304,645 B2
(45) Date of Patent: Apr. 5, 2016

(54) MANUFACTURING METHOD OF TOUCH MODULE

(71) Applicant: Chih-Chung Lin, Taipei (TW)

(72) Inventor: Chih-Chung Lin, Taipei (TW)

(73) Assignee: Chih-Chung Lin, Taipei (TW)

( * ) Notice: Subject to any disclaimer, the term of this patent is extended or adjusted under 35 U.S.C. 154(b) by 96 days.

(21) Appl. No.: 14/322,894

(22) Filed: Jul. 2, 2014

(65) Prior Publication Data

US 2016/0004363 A1  Jan. 7, 2016

(51) Int. Cl.
*H05K 3/02* (2006.01)
*H05K 3/10* (2006.01)
*G06F 3/047* (2006.01)

(52) U.S. Cl.
CPC ........ *G06F 3/047* (2013.01); *G09G 2300/0426* (2013.01); *Y10T 29/49105* (2015.01); *Y10T 29/49117* (2015.01); *Y10T 29/49128* (2015.01)

(58) Field of Classification Search
CPC . G06F 2203/04103; G06F 3/041; G06F 1/16; G06F 2203/04112; G06F 3/0416; Y10T 428/24917; Y10T 29/49128; Y10T 29/49117; Y10T 29/49105

USPC ........... 29/846, 622, 825, 829, 830, 831, 832, 29/842; 345/173, 174
See application file for complete search history.

(56) References Cited

U.S. PATENT DOCUMENTS

| 8,686,967 B2 * | 4/2014 | Ku | G06F 3/041 345/174 |
| 9,153,393 B2 * | 10/2015 | Lin | H01H 11/00 |

* cited by examiner

*Primary Examiner* — Thiem Phan

(57) ABSTRACT

A manufacturing method of touch module includes steps of: providing a substrate and disposing a shield layer on the substrate, a section of the substrate where the shield layer is positioned being defined as a non-touch section, a section of the substrate, which is free from the shield layer being defined as a touch section; printing multiple touch electrodes on the touch section and the non-touch section of the substrate by means of printing process; disposing an insulation layer on the touch electrodes of the non-touch section, the insulation layer being formed with multiple electrical connection holes on the touch electrodes; disposing a lead layer with multiple metal leads on the insulation layer to pass through the electrical connection holes to electrically connect with the touch electrodes; and disposing a protection layer on the touch electrodes and the lead layer.

10 Claims, 6 Drawing Sheets

MANUFACTURING METHOD OF TOUCH MODULE

BACKGROUND OF THE INVENTION

1. Field of the Invention

The present invention relates generally to a manufacturing method of touch module, and more particularly to a manufacturing method of touch module, which can greatly lower the manufacturing cost and increase the structural strength of the touch module.

2. Description of the Related Art

Along with the advance of digital electronic technologies, various digital electronic products such as mobile phones, personal digital assistants, notebooks and tablets have been developed. There is a trend to develop convenient multifunction digital electronic products with beautified appearance.

The display screen of the mobile phones, personal digital assistants, notebooks and tablets is an inevitable human-machine interface of these products. The display screen enables a user to more conveniently operate these products. The liquid crystal display is a mainstream of the display screen.

In recent years, along the rapid development and wide application of the information technologies, wireless mobile communication and information domestic electrical appliances, the touch panel has been popularly used in the information product as an input device instead of the conventional keyboard or mouse. Therefore, these products are more miniaturized, lightweight and humanized to provide more convenient use. In the existent liquid crystal displays, capacitive touch liquid crystal display is the most popular product.

The above touch liquid crystal display is hereinafter referred to as touch panel for short. The touch panel is a laminated structure including a glass substrate, a touch electrode layer, a shield layer, an electrode wiring layer, an insulation layer and a protection layer. These layers are stacked and overlapped to form a laminated structure. The glass substrate has a touch section and a non-touch section. The touch electrode layer is mainly coated on the touch section of the glass substrate by means of sputtering deposition. Then, the touch electrodes are formed by means of photolithography. The shield layer is printed on the non-touch section of the substrate by means of ink printing. Then the electrode wiring layer is coated on the shield layer by means of sputtering deposition. Then the electrode leads are formed by means of photolithography. In the shielded section, the extension ends of the touch electrodes and the not corresponding electrode leads are printed with insulation ink to avoid short-circuit between the extension ends of the touch electrodes and the not corresponding electrode leads. Then the protection layer is coated on the glass substrate, touch electrode layer, shield layer, electrode wiring layer and insulation layer. In the conventional manufacturing method of the touch panel, the touch electrodes and the electrode leads are formed by means of sputtering deposition and photolithography. This costs a great amount of masks so that the manufacturing cost is quite high. Moreover, it is time-consuming to perform the sputtering deposition process. Therefore, the manufacturing cost of the conventional touch panel is very high and the manufacturing time of the conventional touch panel is quite long.

SUMMARY OF THE INVENTION

It is therefore a primary object of the present invention to provide a manufacturing method of touch module, which can lower the manufacturing cost of the touch module.

To achieve the above and other objects, the manufacturing method of touch module of the present invention includes steps of: providing a substrate and disposing a shield layer on the substrate, a section of the substrate where the shield layer is positioned being defined as a non-touch section, a section of the substrate, which is free from the shield layer being defined as a touch section; printing multiple touch electrodes on the touch section and the non-touch section of the substrate by means of printing process; disposing an insulation layer on the touch electrodes of the non-touch section, the insulation layer being formed with multiple electrical connection holes on the touch electrodes; disposing a lead layer with multiple metal leads on the insulation layer to pass through the electrical connection holes to electrically connect with the touch electrodes; and disposing a protection layer on the touch electrodes and the lead layer.

According to the manufacturing method of touch module of the present invention, the manufacturing time is greatly shortened and the use of the masks can be reduced to lower the manufacturing cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
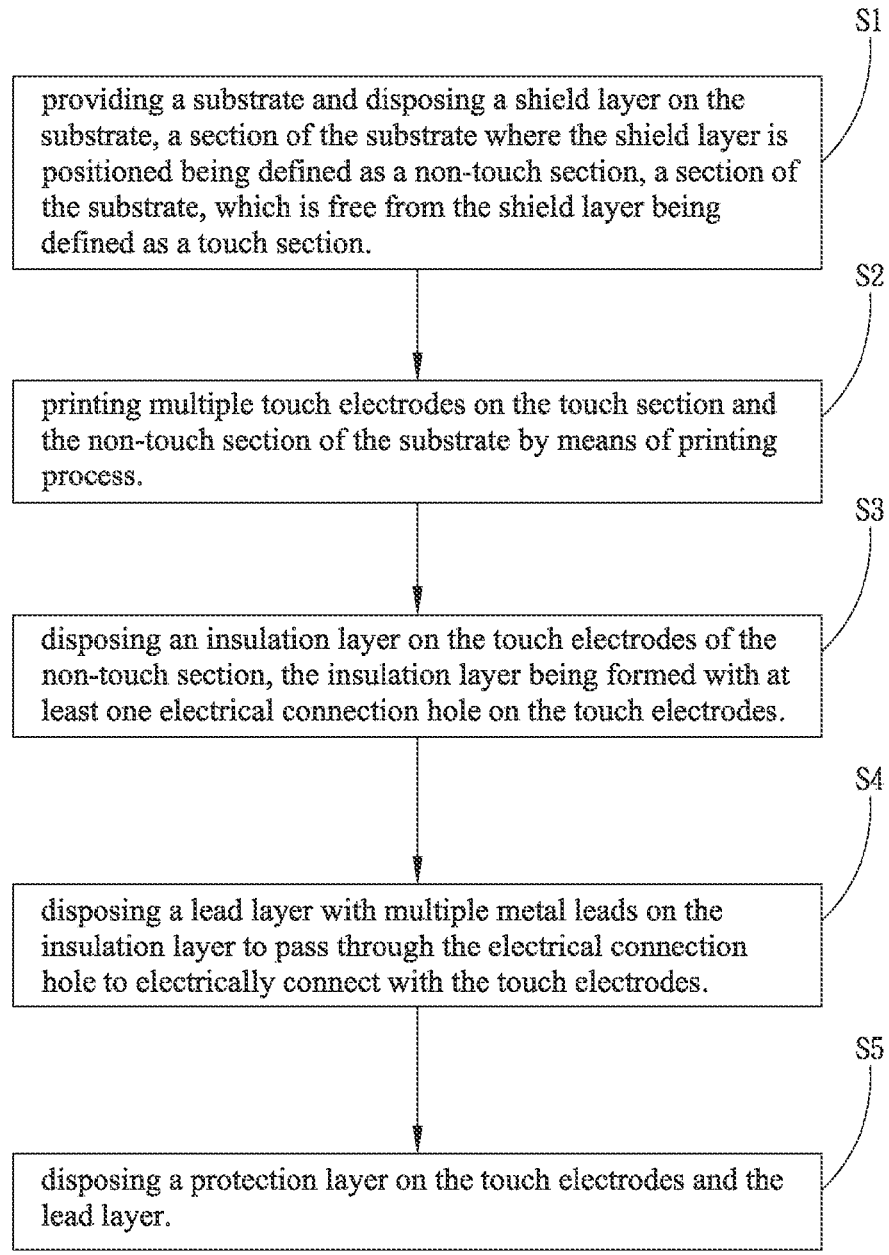
FIG. 1 is a flow chart of a first embodiment of the manufacturing method of touch module of the present invention.
Figure 2:
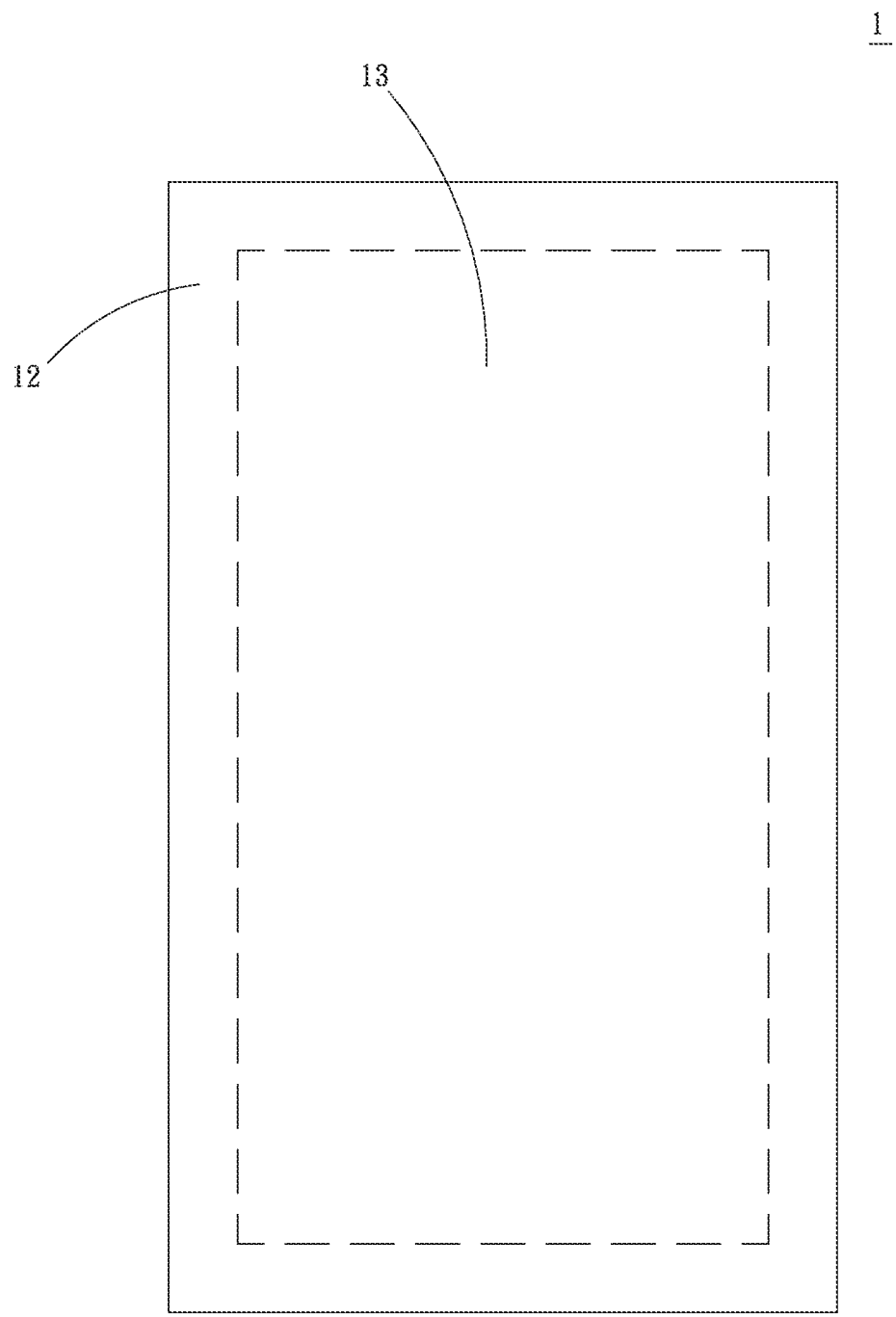
FIG. 2 is a schematic diagram of the structure of the first embodiment of the manufacturing method of touch module of the present invention.
Figure 3:
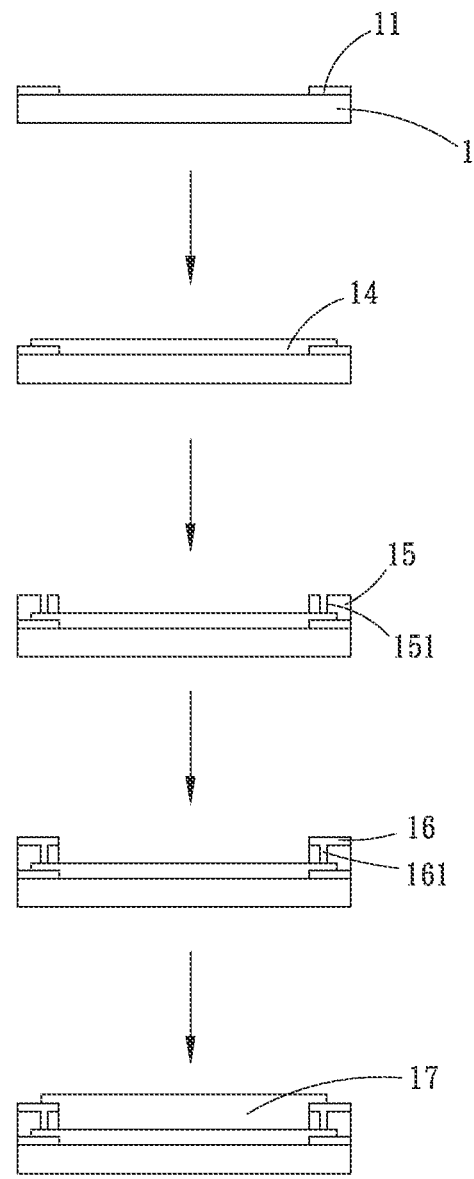
FIG. 3 is a view showing the steps of the first embodiment of the manufacturing method of touch module of the present invention.

Please refer to FIGS. 1, 2 and 3. FIG. 1 is a flow chart of a first embodiment of the manufacturing method of touch module of the present invention. FIG. 2 is a schematic diagram of the structure of the first embodiment of the manufacturing method of touch module of the present invention. FIG. 3 is a view showing the steps of the first embodiment of the manufacturing method of touch module of the present invention. According to the first embodiment, the manufacturing method of touch module of the present invention includes steps of:

S1. providing a substrate and disposing a shield layer on the substrate 1, a section of the substrate where the shield layer is positioned being defined as a non-touch section, a section of the substrate, which is free from the shield layer being defined as a touch section, a substrate 1 being provided, the substrate being a transparent board made from glass or polymer material, the shield layer 11 being formed on the substrate 1 by means of ink coating, a section of the substrate 1 where the shield layer 11 is positioned being defined as a non-touch section 12, a section of the substrate, which is free from the shield layer 11 being defined as a touch section 13, the substrate 1 being a transparent glass substrate, the manufacturing process of the substrate 1 pertaining to prior art so that it will not be further described hereinafter;

S2. printing multiple touch electrodes on the touch section and the non-touch section of the substrate by means of printing process, multiple touch electrodes 14 being formed on the touch section 13 and the non-touch section 12 of the substrate 1 by means of printing process, the touch electrodes 14 being selected from a group consisting of indium tin oxide (ITO), nano-silver, indium zinc oxide, indium tin zinc oxide, hafnium oxide, zinc oxide, aluminum oxide, aluminum tin oxide, aluminum zinc oxide, cadmium tin oxide and cadmium zinc oxide;

S3. disposing an insulation layer on the touch electrodes of the non-touch section, the insulation layer being formed with at least one electrical connection hole on the touch electrodes, an insulation layer being coated on the touch electrodes 14 and the shield layer 11 of the non-touch section 12, the insulation layer 15 being formed on the touch electrodes 14 and the shield layer 11 by means of halftone printing or plate printing, the insulation layer being formed with at least one electrical connection hole 151 corresponding to the touch electrodes 14, the insulation layer 15 being made of a material with a dielectric capacity ranging from 2 to 4, the insulation layer 15 being made of a transparent insulation material such as ink or a nontransparent insulation material, the insulation layer 15 being made of an inorganic material or an organic material, the inorganic material being selected from a group consisting of silicon oxide, silicon nitride, silicon oxynitride, silicon carbide, hafnium oxide and aluminum oxide, the organic material being selected from a group consisting of photoresist, enzocyclobutane (BCB), cycloolefin, polyester, polyalcohol, polyethylene oxide, polyphenyl, resin, polyether and polyketide;

S4. disposing a lead layer with multiple metal leads on the insulation layer to pass through the electrical connection hole to electrically connect with the touch electrodes, multiple metal leads 161 being disposed on the insulation layer 15 and in the preformed electrical connection hole 151 by means of silver paste printing or sputtering deposition to electrically connect the touch electrodes 14 with the lead layer 16; and S5. disposing a protection layer on the touch electrodes and the lead layer, a protection layer 17 being formed on the touch electrodes 14 and the lead layer 16 by means of deposition to protect the touch electrodes 14 and the lead layer 16.

The protection layer 17 is made of an inorganic material or an organic material. The inorganic material is selected from a group consisting of silicon oxide, silicon nitride, silicon oxynitride, silicon carbide, hafnium oxide and aluminum oxide. The organic material is selected from a group consisting of photoresist, enzocyclobutane (BCB), cycloolefin, polyester, polyalcohol, polyethylene oxide, polyphenyl, resin, polyether and polyketide.

Figure 4:
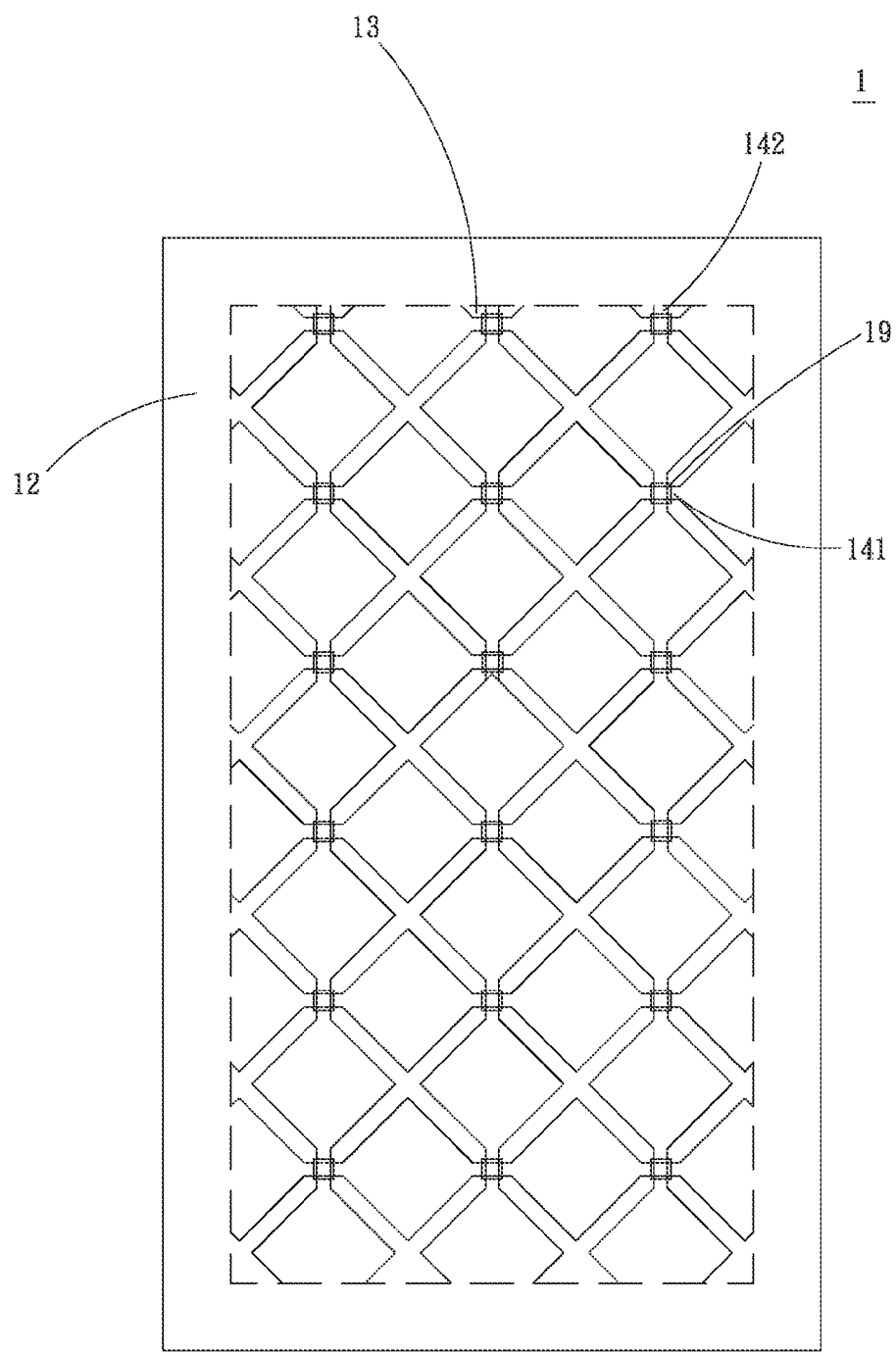
FIG. 4 is another schematic diagram of the structure of the first embodiment of the manufacturing method of touch module of the present invention.

Please now refer to FIG. 4, which is another schematic diagram of the structure of the first embodiment of the manufacturing method of touch module of the present invention. The touch electrodes 14 on the touch section 13 are classified into multiple first serial electrodes 141 and multiple second serial electrodes 142. The first and second serial electrodes 141, 142 are formed on the touch section 13 by means of printing process to connect with the touch electrodes 14 on the non-touch section 14. At least one insulation section 19 is printed at an intersection between the first and second serial electrodes 141, 142 to insulate the first and second serial electrodes 141, 142 from each other.

Figure 5:
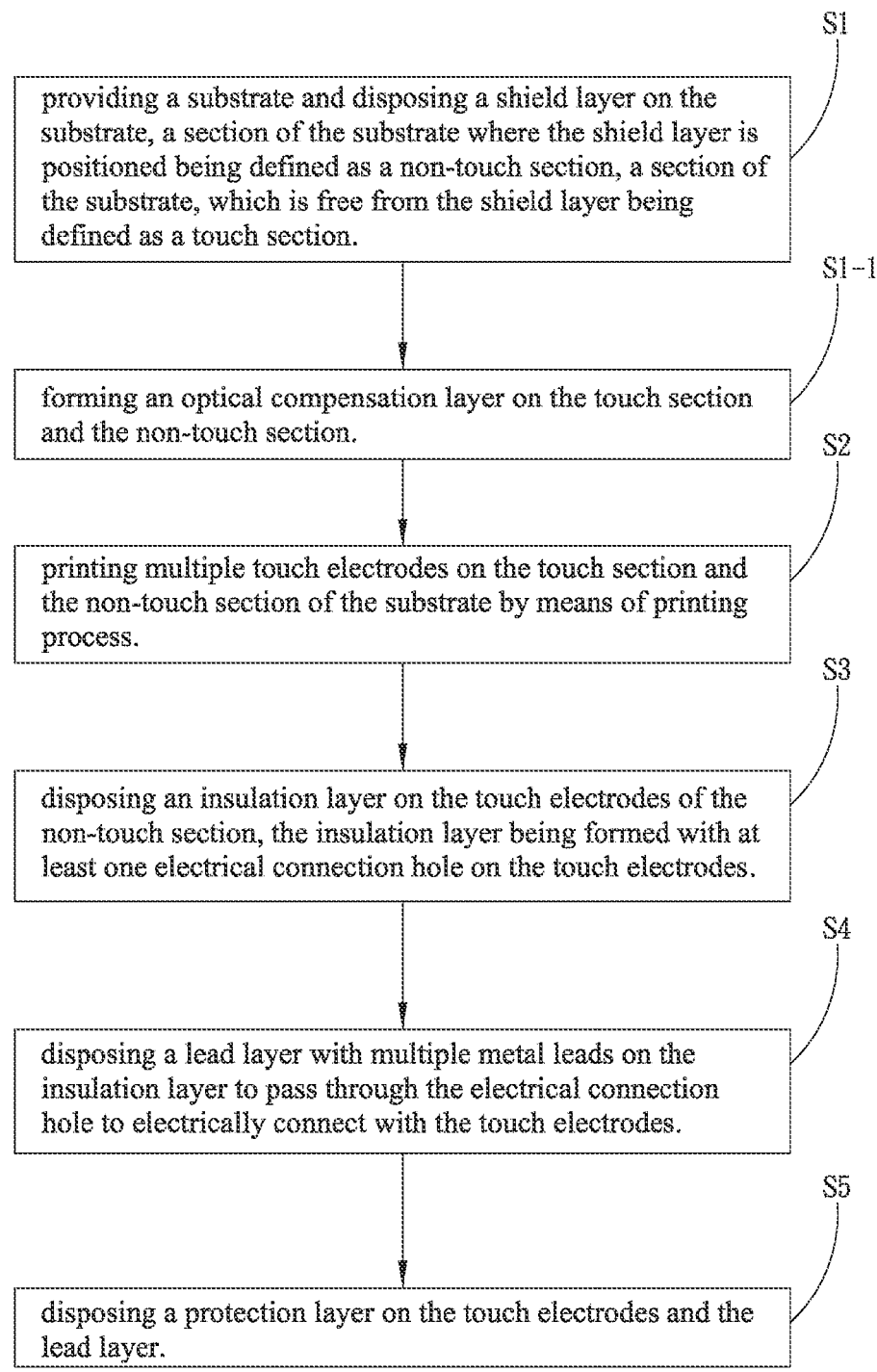
FIG. 5 is a flow chart of a second embodiment of the manufacturing method of touch module of the present invention.
Figure 6:
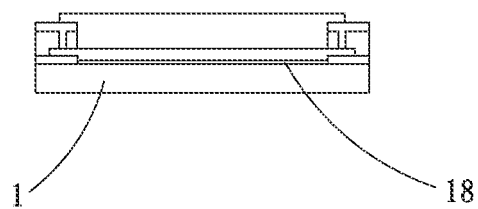
FIG. 6 is a schematic diagram of the structure of the second embodiment of the manufacturing method of touch module of the present invention.

Please now refer to FIGS. 5 and 6. FIG. 5 is a flow chart of a second embodiment of the manufacturing method of touch module of the present invention. FIG. 6 is a schematic diagram of the structure of the second embodiment of the manufacturing method of touch module of the present invention. According to the second embodiment, the manufacturing method of touch module of the present invention includes steps of:

S1. providing a substrate and disposing a shield layer on the substrate, a section of the substrate where the shield layer is positioned being defined as a non-touch section, a section of the substrate, which is free from the shield layer being defined as a touch section;

S2. printing multiple touch electrodes on the touch section and the non-touch section of the substrate by means of printing process;

S3. disposing an insulation layer on the touch electrodes of the non-touch section, the insulation layer being formed with at least one electrical connection hole on the touch electrodes;

S4. disposing a lead layer with multiple metal leads on the insulation layer to pass through the electrical connection hole to electrically connect with the touch electrodes; and S5. disposing a protection layer on the touch electrodes and the lead layer.

The second embodiment is partially identical to the first embodiment and thus will not be repeatedly described hereinafter. The second embodiment is different from the first embodiment in that between step S1 of providing a substrate and disposing a shield layer on the substrate and step S2 of printing multiple touch electrodes onto the touch section and the non-touch section of the substrate by means of printing process, the second embodiment further includes a step S1-1 of forming an optical compensation layer on the touch section and the non-touch section. The optical compensation layer 18 is disposed on the substrate 1 by means of sputtering deposition.

According to the manufacturing method of touch module of the present invention, the manufacturing time is greatly shortened and the use of the masks can be reduced to lower the manufacturing cost.

In conclusion, in comparison with the conventional technique, the present invention has the following advantages:

1. The manufacturing cost is lowered.
2. The use of the masks is reduced.

The present invention has been described with the above embodiments thereof and it is understood that many changes and modifications in the above embodiments can be carried out without departing from the scope and the spirit of the invention that is intended to be limited only by the appended claims.

What is claimed is:

1. A manufacturing method of touch module, comprising steps of:
   providing a substrate and disposing a shield layer on the substrate, a section of the substrate where the shield layer is positioned being defined as a non-touch section, a section of the substrate, which is free from the shield layer being defined as a touch section;
   printing multiple touch electrodes on the touch section and the non-touch section of the substrate by means of printing process;
   disposing an insulation layer on the touch electrodes of the non-touch section, the insulation layer being formed with at least one electrical connection hole on the touch electrodes;

disposing a lead layer with multiple metal leads on the insulation layer to pass through the electrical connection hole to electrically connect with the touch electrodes; and disposing a protection layer on the touch electrodes and the lead layer.

2. The manufacturing method of touch module as claimed in claim 1, wherein the touch electrodes are disposed on the touch section and the non-touch section of the substrate by means of halftone printing or plate printing, the touch electrodes being selected from a group consisting of indium tin oxide (ITO), nano-silver, indium zinc oxide, indium tin zinc oxide, hafnium oxide, zinc oxide, aluminum oxide, aluminum tin oxide, aluminum zinc oxide, cadmium tin oxide and cadmium zinc oxide.

3. The manufacturing method of touch module as claimed in claim 1, wherein the shield layer is formed on the substrate by means of ink coating.

4. The manufacturing method of touch module as claimed in claim 1, wherein the metal leads are disposed on the insulation layer and in the preformed electrical connection hole by means of silver paste printing or sputtering deposition.

5. The manufacturing method of touch module as claimed in claim 1, wherein the insulation layer is formed on the touch electrodes and the shield layer by means of halftone printing or plate printing.

6. The manufacturing method of touch module as claimed in claim 1, wherein the protection layer is made of an inorganic material or an organic material, the inorganic material being selected from a group consisting of silicon oxide, silicon nitride, silicon oxynitride, silicon carbide, hafnium oxide and aluminum oxide, the organic material being selected from a group consisting of photoresist, enzocyclobutane (BCB), cycloolefin, polyester, polyalcohol, polyethylene oxide, polyphenyl, resin, polyether and polyketide.

7. The manufacturing method of touch module as claimed in claim 1, wherein the insulation layer is made of an inorganic material or an organic material, the inorganic material being selected from a group consisting of silicon oxide, silicon nitride, silicon oxynitride, silicon carbide, hafnium oxide and aluminum oxide, the organic material being selected from a group consisting of photoresist, enzocyclobutane (BCB), cycloolefin, polyester, polyalcohol, polyethylene oxide, polyphenyl, resin, polyether and polyketide.

8. The manufacturing method of touch module as claimed in claim 1, further comprising a step of forming an optical compensation layer on the touch section and the non-touch section after the step of disposing the shield layer on the substrate.

9. The manufacturing method of touch module as claimed in claim 1, wherein the touch electrodes on the touch section are classified into multiple first serial electrodes and multiple second serial electrodes, the first and second serial electrodes being formed on the touch section by means of printing process.

10. The manufacturing method of touch module as claimed in claim 9, wherein at least one insulation section is printed at an intersection between the first and second serial electrodes.

* * * * *